Nov. 8, 1927.  
G. D. LUCE  
1,648,313
SUGAR CANE HARVESTER
Filed May 12, 1919     10 Sheets-Sheet 5
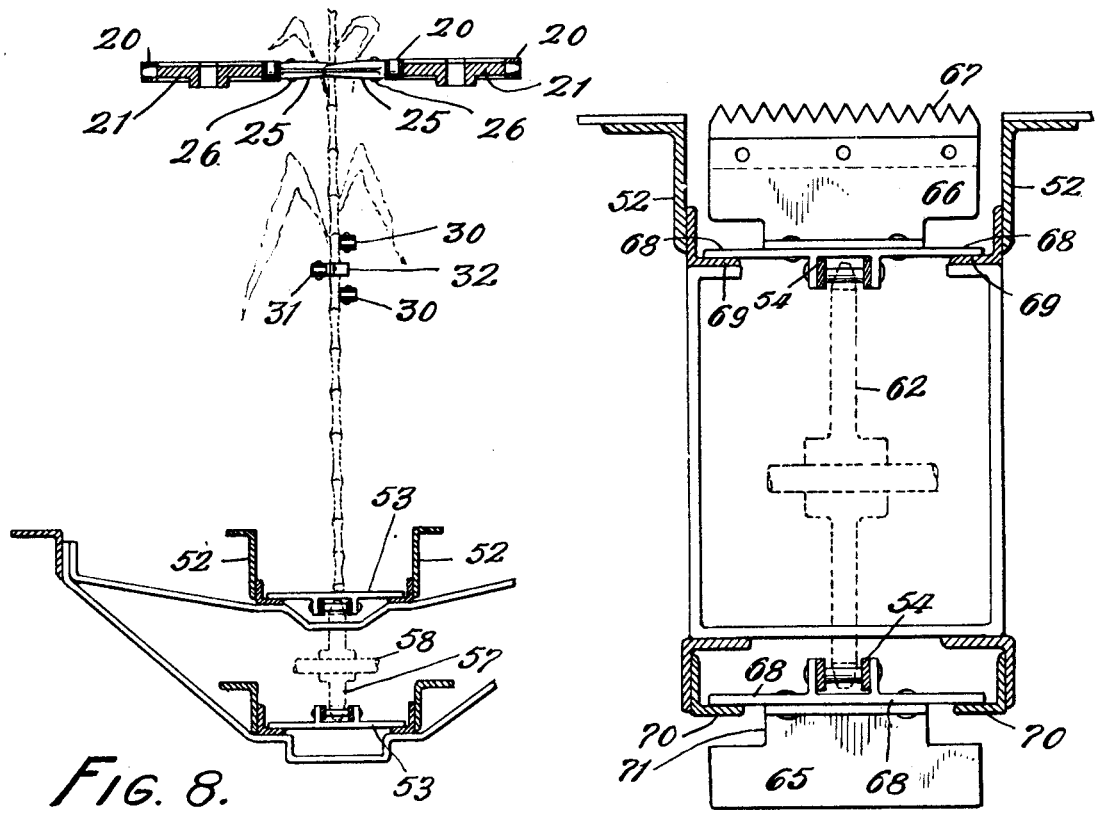
FIG. 8.
FIG. 10.
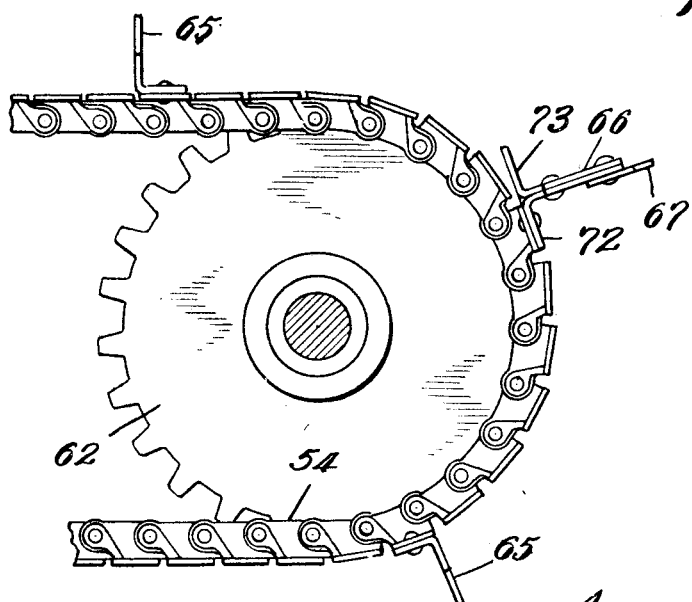
FIG. 9.
INVENTOR  
George D. Luce  
BY  
Edmund Quincy Moses  
ATTORNEY

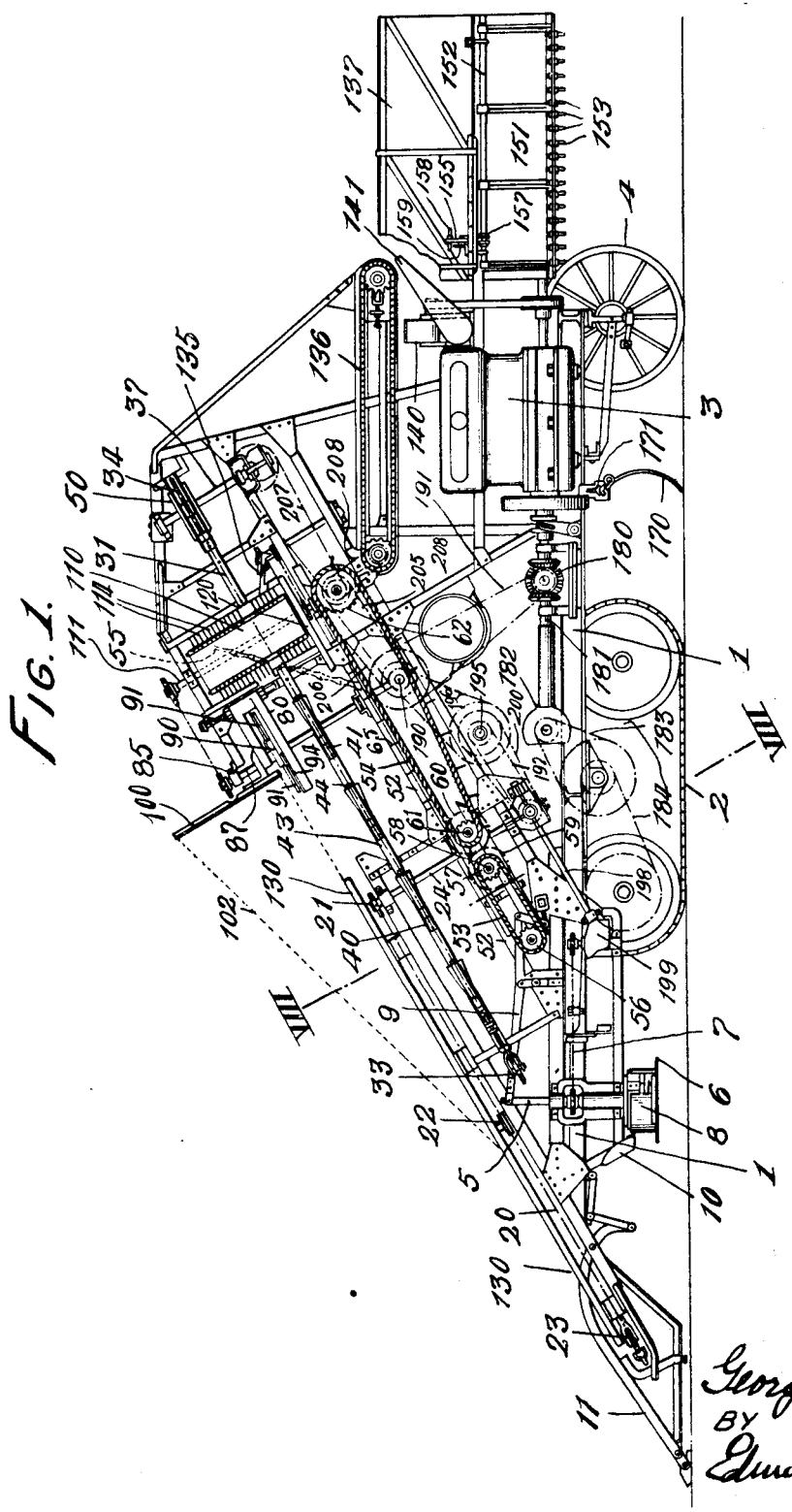

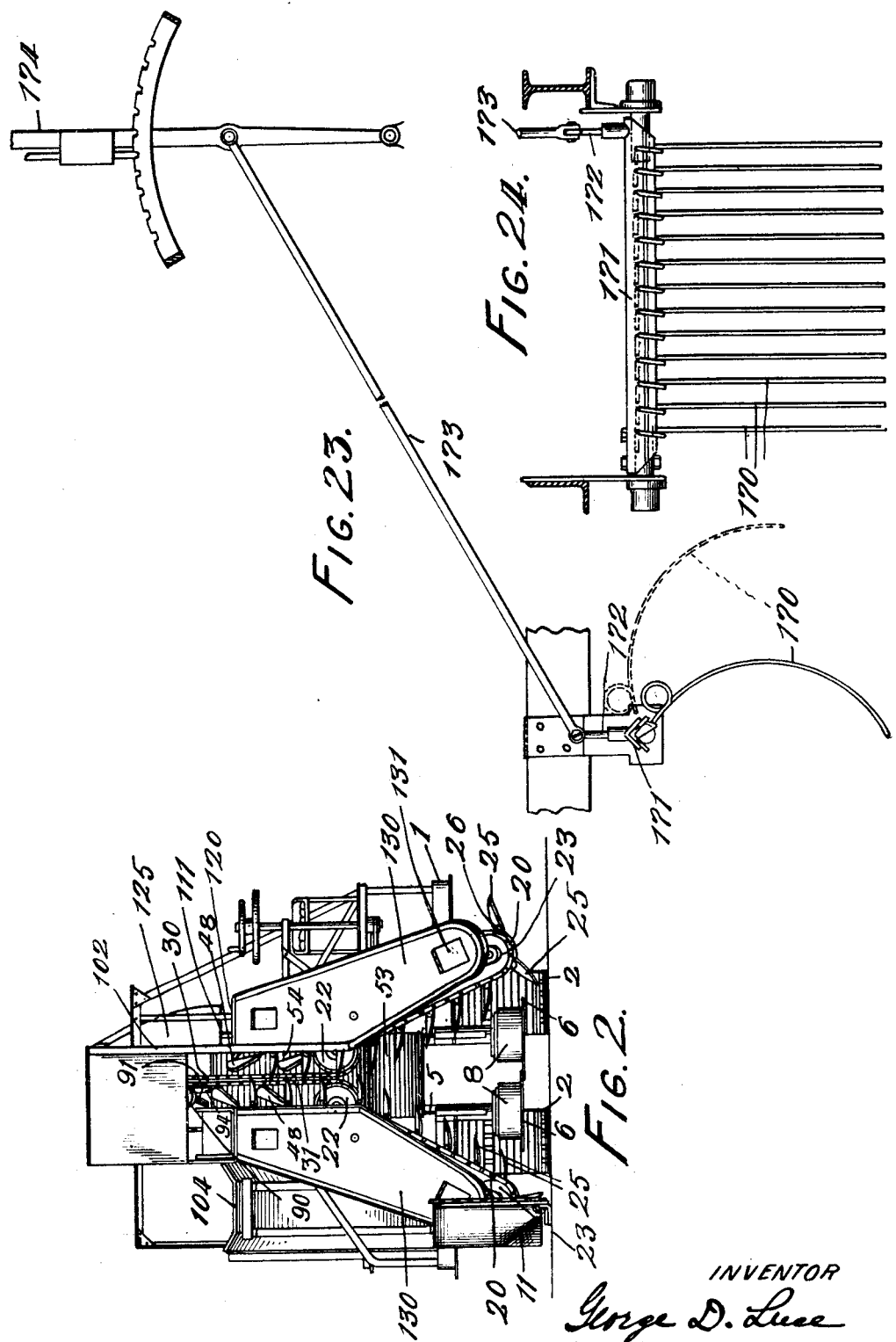

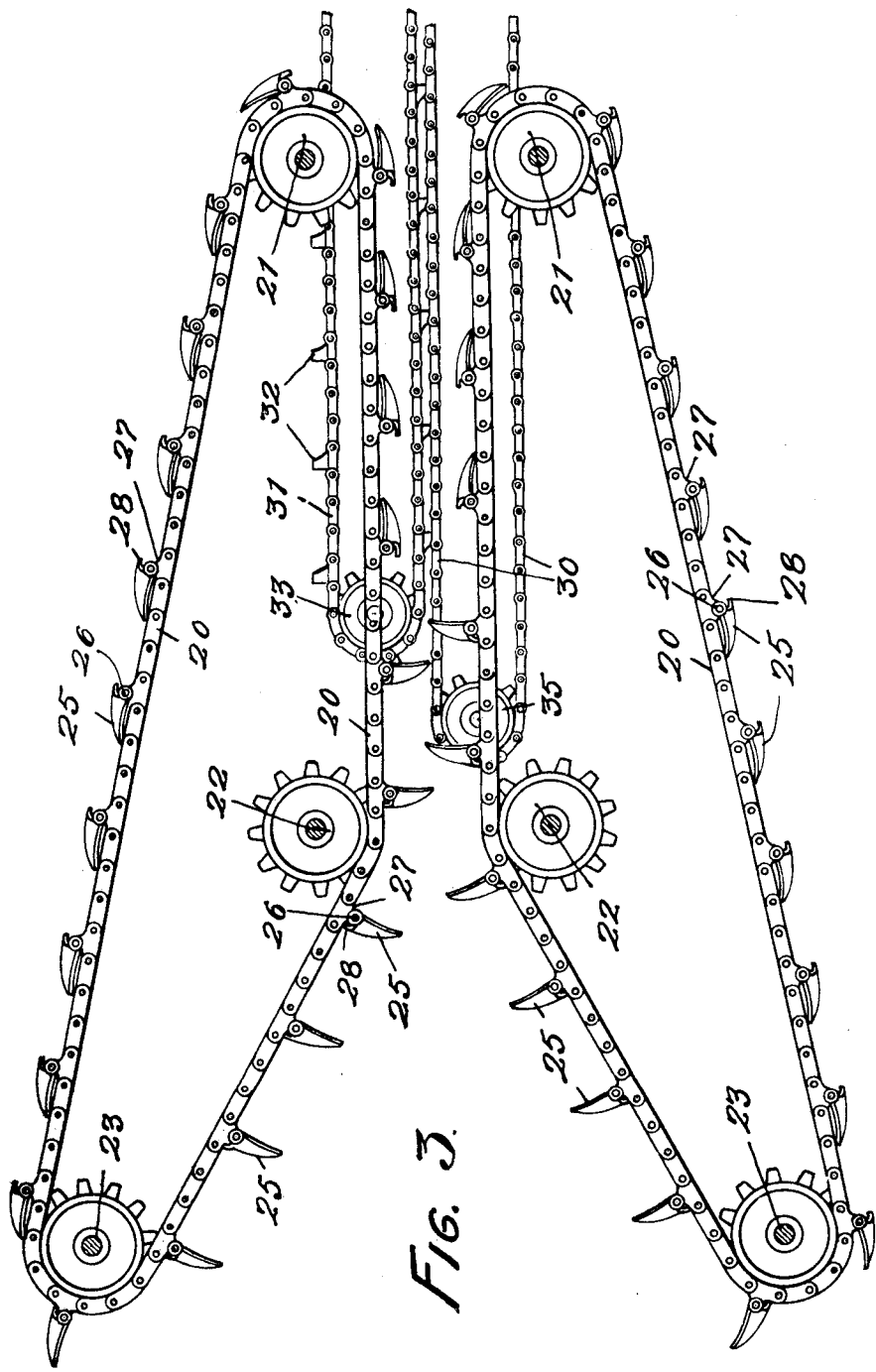

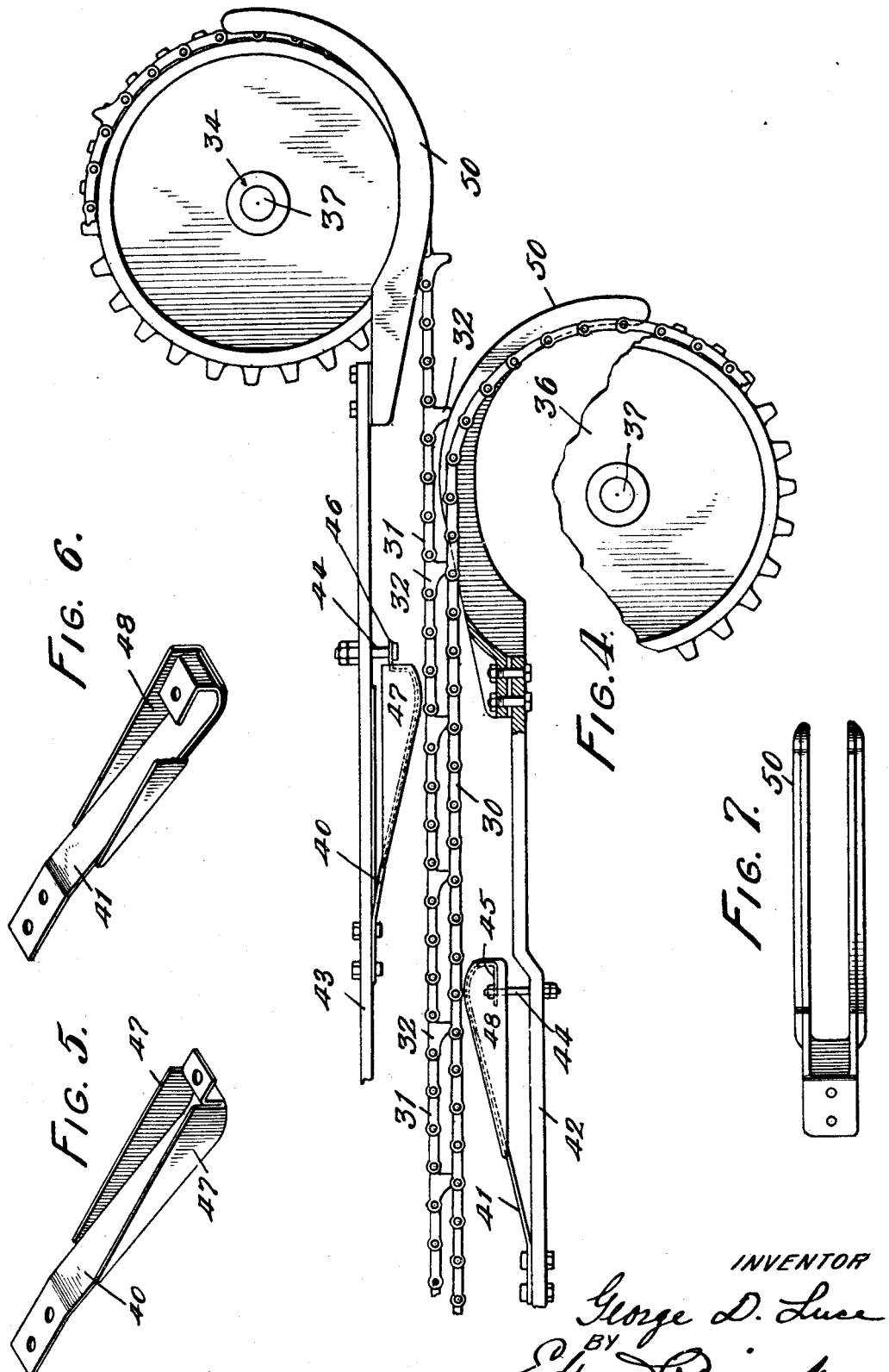

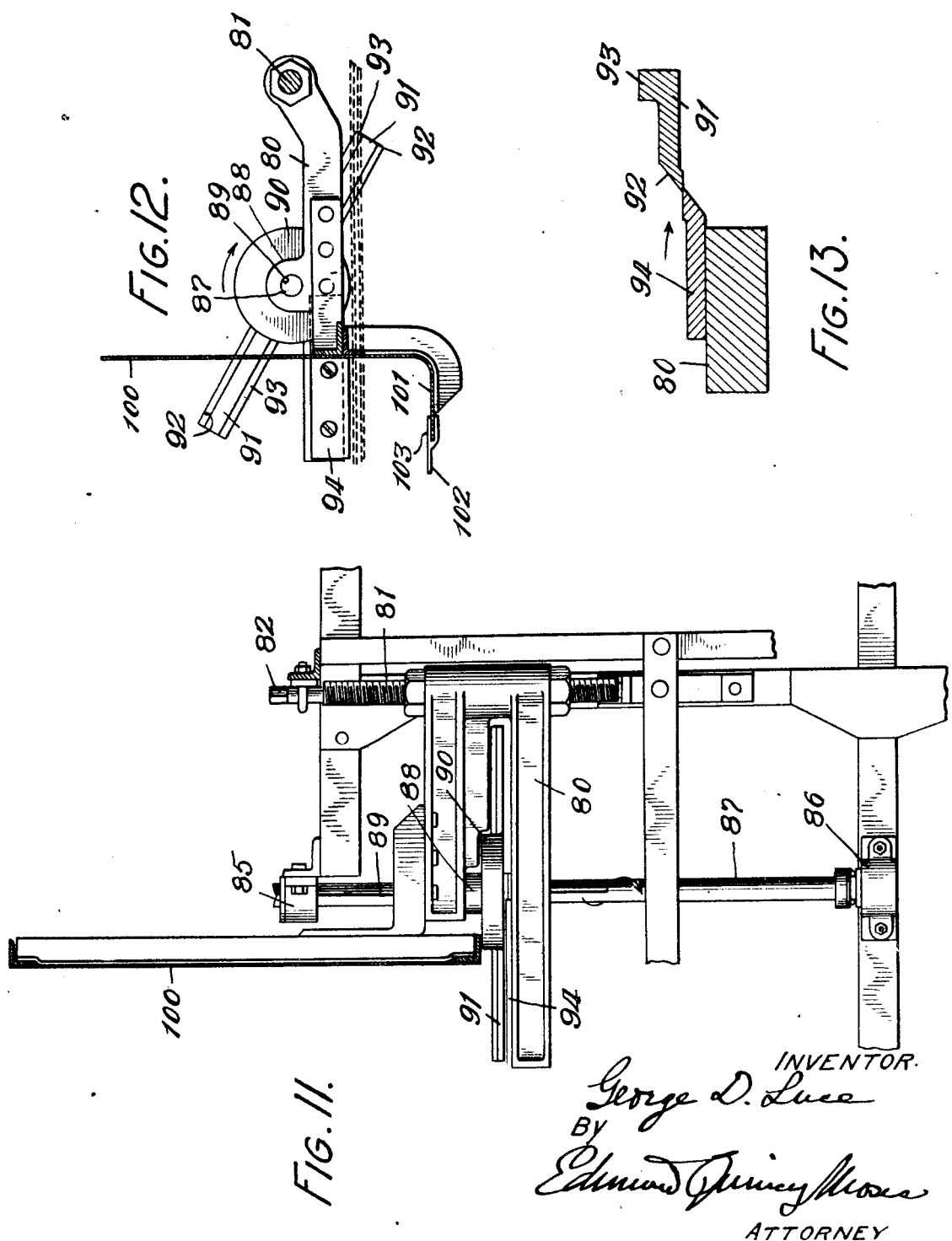

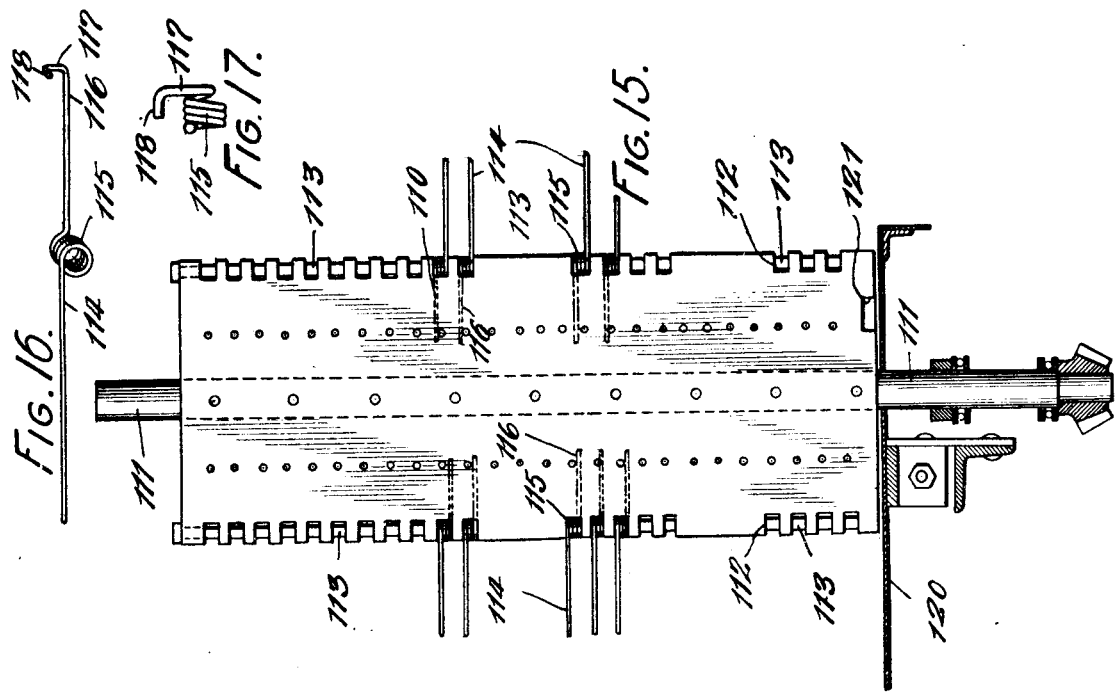
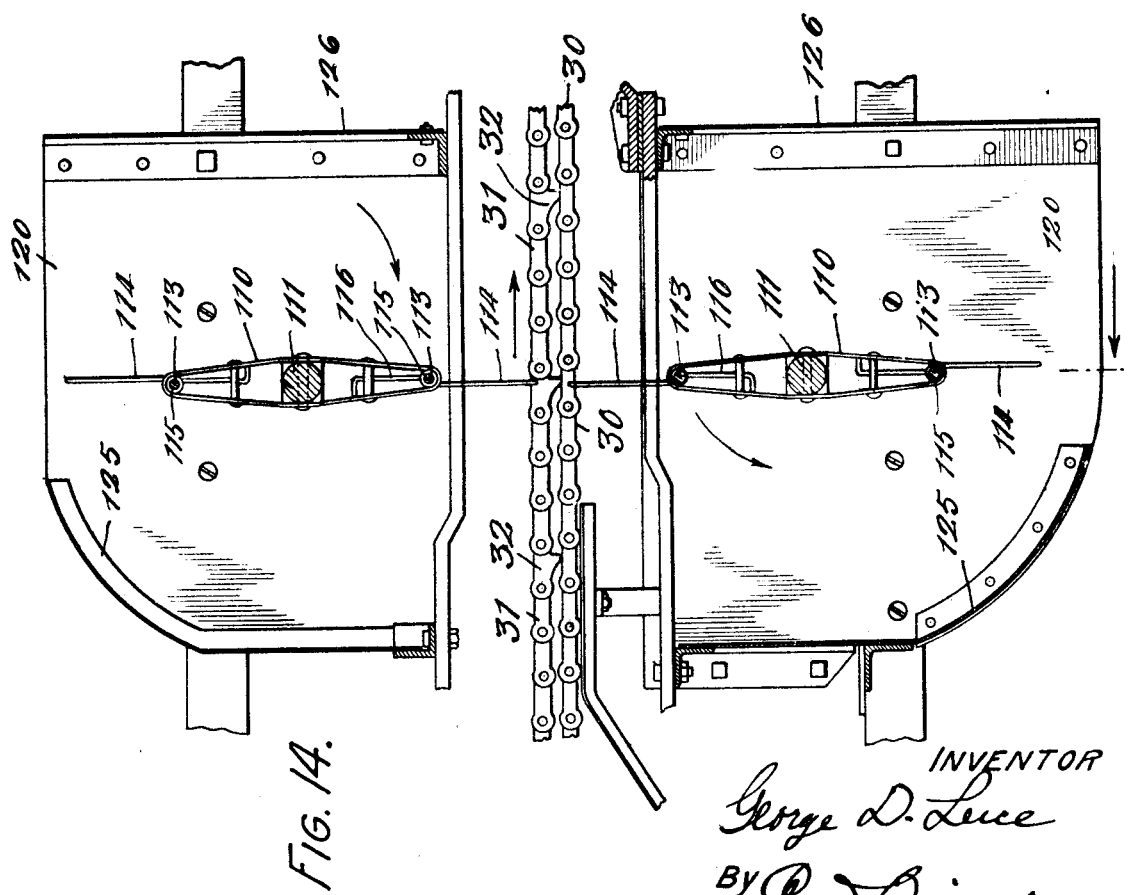

Nov. 8, 1927.  G. D. LUCE  1,648,313
SUGAR CANE HARVESTER
Filed May 12, 1919   10 Sheets-Sheet 8
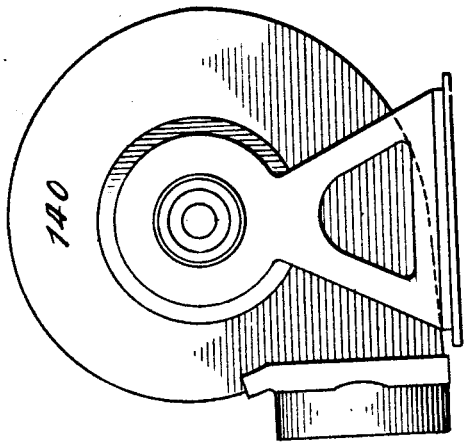
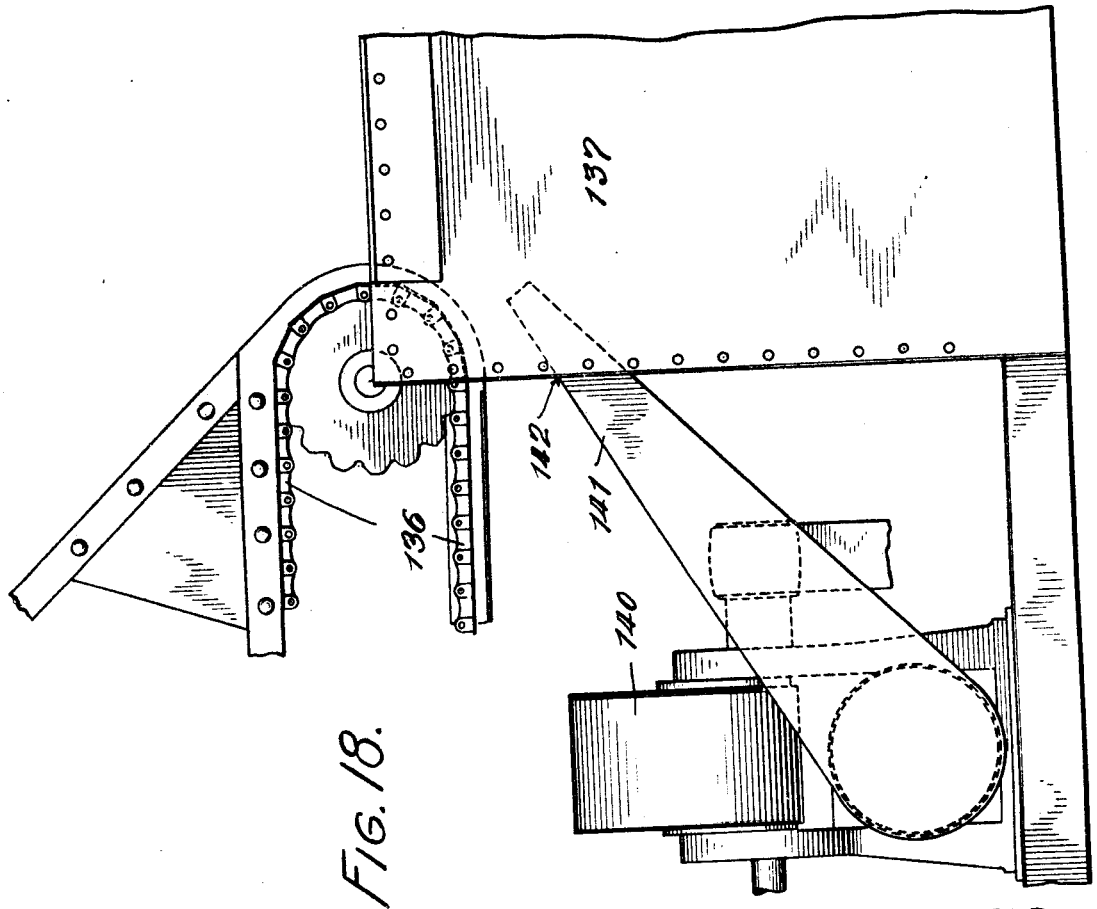

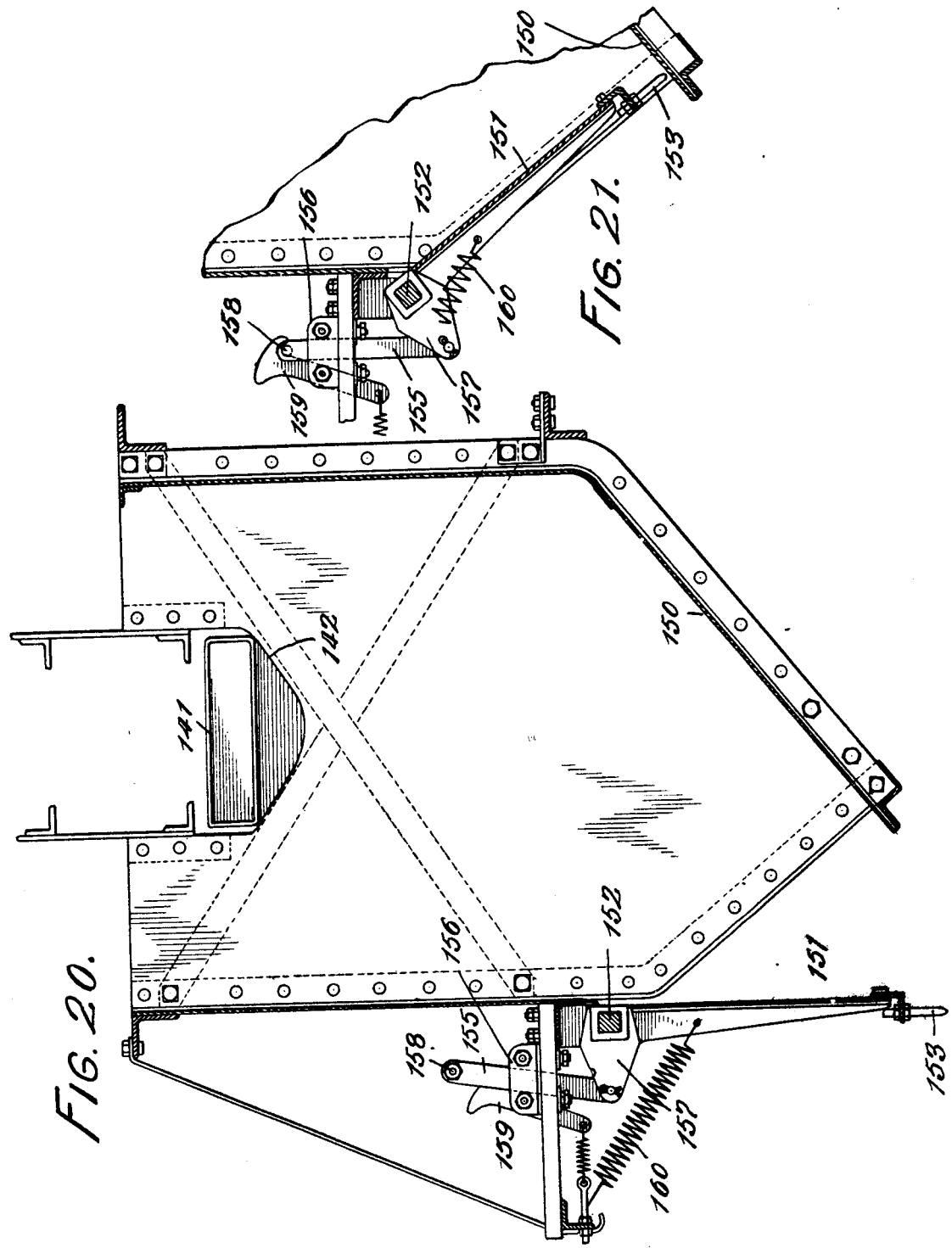

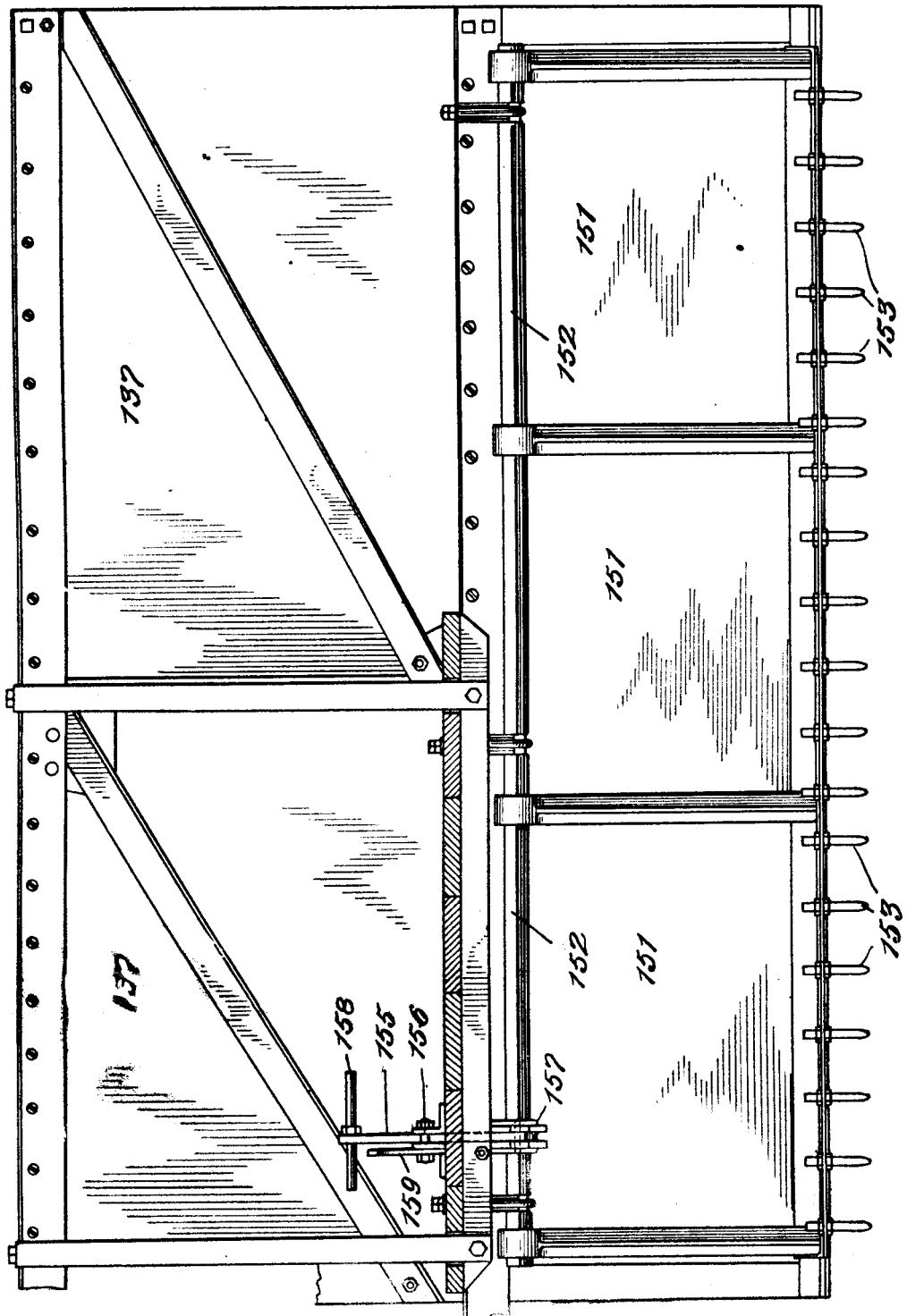

Patented Nov. 8, 1927.

1,648,313

UNITED STATES PATENT OFFICE.

GEORGE D. LUCE, OF WATERTOWN, WISCONSIN, ASSIGNOR TO LUCE CANE HARVESTER CORPORATION, OF NEW YORK, N. Y., A CORPORATION OF DELAWARE.

SUGAR-CANE HARVESTER.

Application filed May 12, 1919. Serial No. 296,539.

This invention relates to harvesters for sugar cane and the like, and particularly to improvements applicable to the general type of harvester disclosed in my prior Patent No. 1,053,917 of Feb. 18th, 1913. A machine of this character is adapted to be propelled along the row of growing cane, cutting the cane as it advances, feeding it through the machine and acting upon it by suitable instrumentalities which prepare it for the mill by removing the green tops and leaves. The present invention deals especially with improved means for feeding the cane into and through the machine, topping and stripping it, and disposing of the topped and stripped cane. More specifically the present improvements include a novel and improved construction of pick-up chains for gathering in the cane and straightening it up prior to and during the cutting operation, and for feeding it to the cane conveying means; improvements in the means for conveying the cut cane through the machine, including novel constructions for guiding the conveyor chains; an improved construction of guide channel or trip chute for the butts of the cane having special reference to the cleaning of dirt and loose stalks out of the channel and also improved means for supporting the butts of the stalks while passing the topping and stripping devices; improved means for topping the cane; improvements in the strippers or brushes for stripping the cane; the provision of means for separating the cane when topped and stripped from loose trash and for depositing the cut, stripped and topped cane in a convenient manner, preferably in piles upon portions of the ground which have been cleaned to receive it. The present invention also relates to various improvements in the general construction of the machine and the means for driving the different parts.

The nature of the various features of the invention and the objects attained thereby can best be explained by reference to a specific machine embodying all of such features, such a machine being illustrated in the drawings accompanying and forming a part of this specification. It is to be understood, however, that the machine specifically illustrated and described represents merely the best embodiment of the invention now known to me, which I have therefore chosen to illustrate, but the invention is not limited to the precise constructions set forth and the various features of the invention may be modified in form or used in other relationships and need not all be employed in a single machine.

In the drawings, Figure 1 is a central vertical longitudinal section of the machine;

Figure 2 is a front view of the machine;

Figure 3 is a plan view of the pick-up chains and parts of the conveyor chains;

Figure 4 is a plan view showing the upper parts of the conveyor chains and the spring pressers and guide forks therefor;

Figures 5 and 6 are perspective views of two forms of spring pressers, a part of one of the guide wings being broken away in Figure 6;

Figure 7 is a side elevation of one of the guide forks;

Figure 8 is a diagrammatic sectional view showing the arrangement of the conveyor chains, pick-up chains, trip chute and mud chain, taken on line VIII—VIII of Figure 1, but on a larger scale;

Figure 9 is a detail side view on a larger scale than Figure 8, showing the upper part of the elevator chain and its sprocket;

Figure 10 is a transverse sectional view, on the same scale as Figure 9, taken across the elevator chain and its guides and showing two of the flights on the chain in elevation;

Figure 11 is a side view of the topping devices, the topping fender being shown in vertical section;

Figure 12 is a plan view of the topping devices;

Figure 13 is a detail view in transverse section of the fixed and revolving topping knives showing the shear action thereof;

Figure 14 is a sectional plan view of the stripping brushes, brush tables and guards;

Figure 15 is a side elevation of one of the brushes mounted on the brush table;

Figures 16 and 17 are detail views showing the construction of the flexible spring fingers or bristles of the stripping brushes;

Figure 18 is a side elevation showing the arrangement of the blower and nozzle used for blowing the loose trash out of the cane being delivered to the hopper;

Figure 19 is a rear view of the blower;
Figure 20 is a transverse section through the hopper showing the hopper door open;
Figure 21 is a detail sectional view showing the hopper door closed;
Figure 22 is a view in side elevation of the hopper;
Figure 23 (Sheet 2) is a detail in side elevation showing the trash rake and connections for operating the same;
Figure 24 (Sheet 2) is a rear view of the trash rake.

Referring to the drawings in detail, particularly to Figures 1 and 2, the machine comprises a frame-work 1 of suitable construction, mounted on a tractor preferably comprising a pair of traveling treads 2, which may be mounted and propelled in any well known manner. These treads are spaced apart sufficiently to travel in the "middles" at each side of the row of cane to be cut. The power for driving these treads to propel the machine as well as for actuating the various mechanism thereof, is derived from a suitable motor indicated at 3. At the rear end of the frame are preferably mounted a pair of trailer wheels 4 which in the present instance are used for steering. Near the front of the frame are mounted a pair of vertically adjustable shafts 5 carrying at their lower ends the disc cutters 6, the shafts and cutters being positively rotated by suitable means such as the driving chains 7. The cutters shown are of the general character set forth in my Patent No. 762,073, and are preferably provided with trash impellers 8 of the type covered by my Patent No. 1,207,580, and as illustrated embody also the improvements set forth in the application for patent filed by myself and F. C. D. Wilkes on July 21, 1919, Serial No. 312,316, filed July 15, 1919, now Patent No. 1,442,032, granted January 9, 1923, which is assigned to the same assignee as the present application. Suitable means such as the levers 9 and operating devices therefor, are provided for raising and lowering the cutters, Figures 1 and 2 showing the cutters fully raised, as when the machine is not in operation. When the cane is actually being cut the cutters are lowered so as to cut the cane at or below the ground level. In front of the cutters are mounted the trash deflectors 10 which are also described and claimed in the said application of myself and Wilkes. It will be understood that the trash deflectors and impellers are not in all cases essential and in fact the present invention is not limited to use with the cutters of the type herein disclosed, as any other practical form of cutting means may be substituted. At the very front of the machine a separator plow 11 is shown, the purpose of this plow being to travel between the rows of cane being cut and the adjacent row of uncut cane in order to separate the leaning cane of the two rows and assist in directing the cane of the row being cut into the throat of the machine between the pick-up chains. This plow is not claimed in this application and will not be described in detail as it forms the subject matter of an application for patent filed by F. C. D. Wilkes and F. K. Flynn, Serial No. 310,956, filed July 15, 1919, and assigned to the same assignee as the present application. Some form of separator plow is preferably mounted on the machine for the purposes stated but is not essential.

Mounted on the forward part of the machine, preferably in an upwardly and rearwardly inclined position, are the pick-up chains 20 (see Figures 1, 2 and 3). These chains run over sprockets 21, 22 and 23, the sprockets 21 being mounted on shafts 24 which are driven from the motor. The chains are provided at intervals with the hinged fingers 25 which are mounted on pivots 26 carried by projecting lugs 27 formed on certain of the links. The fingers are provided with stops 28 which engage abutments carried by the chain links and serve to limit the pivotal movement of the fingers in one direction. The fingers are thus held against movement beyond a position approximately at right angles to the chain, in a direction opposed to that of the movement of the chain, but are capable of being folded against the chain in the direction of movement of the chain. The parts of the chains between the sprockets 22 and 23 flare outwardly as shown in Figure 3 so as to form a V-shaped opening or throat which gathers in the cane of the row to be cut, the chains serving to lift the leaning or fallen cane, straighten it up, and draw it into the machine and against the cutters. These chains are preferably driven at such a speed that the horizontal component of the movement of the fingers is equal or substantially equal to the rate of forward travel of the machine.

Immediately after the cane is severed by the disc cutters and while it is still held by the pick-up chains, it is seized by the conveyor chains of which there are preferably three as shown in Figures 1, 3, 4 and 8. As appears particularly from Figure 8 there are two vertically spaced chains 30 on one side of the line of travel of the cane and a single chain 31 on the other side, the rearward traveling runs of which are forced together by spring pressure so as to grip and hold the cane firmly and carry it upwardly towards the rear of the machine. The chain 31 is preferably provided at intervals with lugs 32 as shown in Figures 3 and 4 to assist in carrying the cane through the machine. The chain 31 runs over sprockets 33 and 34 at its front and rear ends, and the chains 30 run over sprockets 35 and 36. The sprockets 34 and 36 are mounted on shafts 37 which are positively driven from the motor, the conveyor chains being preferably driven at a considerably greater speed than that of the pick-up chains, which latter, as stated, preferably travel at approximately the speed of the forward movement of the machine. In practice I prefer to make the conveyor chains travel about three times as fast as the pick-up chains. Owing to this higher speed of the conveyor chains it is advantageous to make the fingers on the pick-up chains hinged as above described, or otherwise capable of yielding, so that such fingers will not interfere with the movement of the cane when gripped by the conveyor chains, and carried rearwardly at the higher speed thereof. When the cane is gripped by the conveyor chains the fingers on the pick-up chains which are in the path of the cane simply pivot rearwardly as shown in Figure 3 so as to permit the cane to be carried between them.

For applying the spring pressure to the rearwardly traveling stretches of the conveyor chains, so as to cause them to grip the cane, I preferably employ a series of spring metal pressers 40 and 41 as shown particularly in Figures 4, 5 and 6, these pressers being fastened at their forward ends to the frame members 42 and 43 and bearing against the chains at their outer or free ends. Means may be provided for limiting the outward movement of the springs, such as the check bolts 44 engaging the turned over or offset ends 45 and 46 of the springs. Owing to the sagging of the chains or to their engagement with the cane, the chains are sometimes forced off the bearing surfaces of the springs and in order to prevent them from catching behind the springs I preferably provide the latter with guide wings over which the chains will slide without catching until they find their way back again on to the bearing faces of the springs. These wings may be formed by bending down extensions of the springs as shown at 47 in Figure 5, or a separate cover member carrying the wings 48 may be attached to the outer surface of the springs as shown in Figure 6. With the wing construction there is no catching of the chains, but if the chains are momentarily forced off the springs they quickly resume their normal position. The spring pressers yield sufficiently to permit the chains to separate so as to accommodate the larger canes and at the same time keep the chains in contact with the cane at all times so that the cane is firmly held.

In order to positively guide the conveyor chains at their upper ends on to the driving sprockets 34 and 36, I preferably provide the guide forks 50 as shown in Figures 4 and 7, between the arms of which the chains run, the arms thus positively guiding the chains on to the sprockets. The arms preferably extend part way around the sprockets so that there is no chance for the chains to jump off.

As the cane is carried upwardly and rearwardly by the conveyor chains the butts of the stalks are drawn into a guide channel or trip chute, best shown in Figures 1, 8 and 10. The sides of this trip chute are formed by the angle irons 52 and the bottom of the chute is formed by the two chains or endless belts 53 and 54. The lower belt or chain 53 which I term the "mud chain" is a short chain belt without raised flights, the upper run of which travels forwardly and downwardly. The object of this chain is to detach the dirt which is likely to adhere to the butts of the cane, particularly where the latter is cut slightly below the ground, as is done wherever possible. This mud chain carries the dirt out of the chute and prevents it from accumulating in the machine. It also assists in getting rid of "suckers" or canes which are too short to be grasped by the conveyor chains and carried through the machine. The forward end of the mud chain also serves as an abutment for tripping the cane to give it a rearward inclination as it is held by the conveyor chains. The forward end of the mud chain is so located that as the cane is carried upwardly and rearwardly by the conveyor chains it will strike the mud chain slightly above the butts and will thereby be forced into the desired inclined position which position it will occupy through the remainder of its passage through the machine past the topping knife and stripping brushes, the butts of the cane resting first on the mud chain and then on the elevator chain 54. The position of the cane passing the brushes is indicated in dotted lines at 55 in Figure 1. The mud chain 53 travels over a sprocket 56 at its lower end, and over a sprocket 57 at its upper end. The last named sprocket is mounted on a shaft 58 to which is fixed a gear 59 which meshes with a gear 60 mounted on the shaft of the sprocket 61 at the lower end of the elevator chain. At its upper end the elevator chain runs over a sprocket 62 which is positively driven from the motor. The upper run of the elevator chain travels upwardly and rearwardly in the direction of movement of the cane, preferably at a speed higher than that of the conveyor chains. In practice I have obtained good results by driving the elevator chain in the neighborhood of one hundred feet per minute faster than the conveyor chains. The elevator chain is also provided at intervals with raised flights 65 which engage the butts of the cane to prevent the cane from slipping downwardly while passing through the machine. The elevator chain is also preferably provided with one or more flights 66, three being the number which I have utilized in practice. These high flights are provided with serrated edges 67, the sharp points of which engage any stalks of cane which may happen to slip out of the conveyor chains and fall into the chute and conveys such stalks out of the chute so as to prevent any accumulation thereof in such a way as might tend to clog the machine. The edges of these flights may be formed or sharpened in any other suitable manner to prevent the cane from slipping over them. The links 68 of the elevator chain are preferably guided at their edges by the guide bars 69 and 70 as shown in Figure 10, the flights being notched out as indicated at 71 so as to clear the lower guide bars 70. The flights 66 are preferably T shaped in section as shown in Figure 9, one arm 72 of the T being fastened to a flight and the other arm 73 being free so as to permit the chain to pass around the sprockets but being adapted to rest upon the adjacent flight during the straight part of the travel of the chain.

The cane being carried upwardly and rearwardly by the conveyor chains and having been tripped by the engagement of its lower ends with the front of the mud chain and the butts of the cane traveling up through the guide channel formed by the mud chain, and elevator chain, and the side walls 52, is next acted upon by the topping devices which cut off the green tops of the cane. The topping means are shown in Figures 1, 2, 11, 12 and 13. The topping knife frame 80 is preferably constructed as shown most clearly in Figures 11 and 12, this frame being of a sort of yoke shape having two arms connected to a body or base at one end and being suitably mounted to have an up and down adjustment. As illustrated, the frame is mounted on a rotatable screw threaded shaft 81 attached to members of the main frame of the machine and which is provided with a squared upper end 82 which may be engaged by a wrench so that the screw shaft may be turned to adjust the frame up or down. Journalled in bearings 85 and 86 on the main frame is the topping knife shaft 87 which is rapidly rotated by power from the motor. This shaft passes through a bearing 88 on the topping knife frame and is provided with a spline 89. The topping knife hub 90 is mounted between the arms of the topping knife frame and has a feather fitting in the spline 89 so that it is positively rotated with the shaft 87 but is longitudinally slidable thereon and is capable of vertical adjustment with the frame 80. The hub 90 carries the revolving topping knife blades 91 which are preferably of a cross section such as shown in Figure 13, each blade being sharpened at one edge 92 and having a raised rib 93 along the back. Mounted on the lower arm of the topping frame 80 is a fixed blade 94 adapted to cooperate with the revolving blades 91 so that the latter will cut the cane with a shear action. The topping knife is revolved rapidly in the direction of the arrow in Figure 12 and engages the cane as it is carried up by the conveyor chains and severs the green tops. The ribs 93 strike the tops as they are severed and throw them clear of the topping knives so as to effectually prevent the tops from falling down into the conveyor chains and tending to clog the machine. This is an important function and is very effectually performed by providing ribs or raised members along the backs of the revolving knife blades. The frame 80 preferably carries a topping fender 100 which is adjustable up and down with the frame and topping knife and which is struck by the tops of the cane as the latter are carried up by the conveyor chains. This fender serves to bend over the green tops of the cane so that the cane will be topped as near as possible at the point where it is bent, this point constituting the line of demarcation between the ripe cane which is comparatively stiff and the green top which is flexible. The topping fender preferably extends at right angles to the plane of revolution of the topping knife and to the conveyor chains and transversely across the machine, as shown in Figure 12, and has a flange 101 extending forwardly a short distance at one side. As shown in Figure 2 a vertical shield 102 may be mounted at one side of the path of travel of the cane up through the machine and is connected at its upper edge by a sliding joint 103 with the flange 101. This shield, when used, holds the cane away from the side of the machine where the operator stands and prevents any tops from being thrown out in that direction. The revolving knife, owing to the projection on the back tends to throw the tops towards the opposite side of the machine and a chute 104 is preferably provided to receive the tops and carry them out of the way towards the back of the machine.

After the cane has passed the topping knife and been topped by it, it is next carried by the conveyor chains between the rapidly revolving stripping brushes. These may be of any suitable construction but are preferably of substantially the form shown in Figures 14 to 17. As here illustrated, each of the brushes comprises a broad substantially flat casing 110 formed of sheet metal and mounted on a shaft 111, the portion of which within the casing is preferably of square cross section so that the casing may be firmly riveted thereto and caused to positively rotate with the shaft. The casing is formed with a plurality of notches 112 along each edge and extending longitudinally inside of each edge is a rod 113. The flexible fingers or bristles 114 of the brush are formed of spring wire each wire being coiled between its ends into a short helical coil 115 through which the rod 113 is adapted to be passed, thus securing the bristles to the casing. The inner part 116 of the wire is received between the side walls of the casing and thus maintains the outer part of the bristles in an outwardly projecting position. The end of the portion 116 is bent at right angles thereto as indicated at 117 in Figures 16 and 17, the extreme tip being again bent over as indicated at 118, this last named bent portion being adapted to engage the casing wall and owing to its shape preventing the casing from being engaged by a sharp end of the wire which would tend to cut through the same. The coil 115 acts as a spring and permits the wire bristles to yield freely while providing great durability. Durability and flexibility are also promoted by the use of a long arm 116 within the casing which engages the casing only at its inner end and may thus yield to assist in taking up the initial shocks when the tips of the wires strike the cane, and also the recoil which occurs when the tips of the wires pass the cane after having been deflected by engagement therewith. The flat hollow construction of the brush casing is valuable as providing for the reception of the bristles in the manner described, and also because of its fan action when rapidly revolved. By reason of this action it throws or blows the leaves and trash stripped from the cane away from the machine and thus not only clears itself from the trash but tends to prevent the trash from falling in or near the machine where it may clog the same or get in the way of the operator. The brushes are positively rotated by power from the motor, a speed of rotation which I have found satisfactory in practice being in the neighborhood of 800 revolutions per minute. The brush shafts 111 are mounted in suitable bearings in the machine and are preferably disposed substantially at right angles to the conveyor drive in vertical planes at each side thereof, so that they occupy a forwardly and upwardly inclined position. Owing to this position and to the substantially vertical or somewhat rearwardly inclined position of the cane as held by the conveyor chains, the brushes act to strip the cane diagonally downward which removes the leaves therefrom most effectively. The brushes preferably rotate in the direction of the arrows shown in Figure 14 so that the movement of the stripping fingers during the stripping operation is in the opposite direction to that of the travel of the cane.

In order to prevent the leaves or trash from wrapping around the brush shafts or getting into the driving gearing each brush is mounted immediately above a brush table 120, the bottom of the brush casing rotating over this table with only a slight clearance. In this way the trash is not able to get under the brush casing or to come in contact with the shaft. As the spring fingers sometimes break, pieces of the rear ends thereof may fall down inside of the casing, and in order to prevent such pieces becoming jammed between the edges of the casing and the table, notches 121 are preferably formed in the back of each wing of the casing to permit any such fragments to be thrown out. The brushes are preferably partly enclosed between the front shields 125 and rear shields 126 which protect the operator from the revolving brushes and also cause the trash to be thrown out laterally through the open spaces between the shields so as to prevent any of the trash being thrown where it will be in the way or where it may get into any other part of the machine.

Protecting shields or housings may be employed about the machine wherever found desirable to protect working parts, gearing, sprockets, etc., especially wherever trash might come in contact with such parts and tend to accumulate or clog the machine. I have not illustrated all such housings as they would prevent the operative parts of the machine from being properly shown in the drawings. In Figure 2, however, I have shown the housings 130 which cover the pick-up chains, leaving the projecting fingers only exposed. These housings are preferably provided with suitable openings to permit access to the bearings, the openings being covered by hinged doors as indicated at 131.

After the cane has passed the topping and stripping devices as described and has been topped and stripped ready for the mill, means may be provided for cutting it in two so as to facilitate its further handling. I have illustrated diagrammatically in Figure 1 a middle cutter for this purpose, as indicated by the numeral 135. Any suitable form of cutter may be utilized for this purpose or such cutter may be omitted altogether and the cane delivered full length.

The topped and stripped cane when released by the conveyor chains may be disposed of in any suitable manner. In the machine shown the cane is cut in two by the middle cutter 135 and then falls on a travelling apron 136 which carries the cane to the rear and drops it into a hopper 137. As a certain amount of detached leaves and trash generally accompanies the cane I preferably provide means for separating out this trash so that only the cleaned cane itself is deposited in the hopper. The means shown for cleaning out this trash comprise a blower 140 shown in Figures 1, 18 and 19, which is mounted near the rear end of the machine and which has a nozzle 141 preferably of flattened shape and arranged to direct a strong current of air upon the cane as it falls from the apron 136 into the hopper. As illustrated, the blower nozzle 141 is located directly under the apron and projects into an opening 142 in the end of the hopper (see Figure 20). The trash being light is blown away by the current of air and only the cleaned cane falls into the hopper.

The hopper may be of any suitable construction, but the form which I prefer to employ is illustrated in Figures 1, 20, 21 and 22. This hopper has a laterally inclined bottom 150 as shown in Figure 20, and a door 151 fixed to a shaft 152 mounted for oscillating movement. The door is shown open in Figures 20 and 22 and closed in Figure 21. It is preferably provided along its edge with a series of pins 153, this construction being adopted so that the door may be closed without jamming upon any stalks of cane which may be at the time sliding out of the hopper. This construction is desirable as the cane is constantly being delivered by the apron 136 so that there is always some cane dropping into the hopper. The door is capable of being closed by means of a plunger 155 slidably mounted in a bracket 156 and pivoted at its lower end to an arm 157 on the shaft 152. The plunger 155 carries a cross pin 158 adapted to be pressed down by the foot of the operator when closing the door and to be engaged by latch 159 which holds it down and maintains the door closed. When the door is to be opened the operator retracts the latch with his foot and the door opens by gravity, aided if necessary by a spring 160. Any other suitable door controlling devices may be employed.

In order that the cane discharged from the hopper may fall on a comparatively clean spot so as not to become intermingled with the trash with which the field is covered, I preferably provide means for raking away the trash immediately in front of the hopper. For this purpose I mount a rake on the machine as shown in Figures 1, 23 and 24. The rake illustrated comprises a plurality of rake teeth 170 attached to a bar 171 journalled horizontally under the main frame. Connections are provided for swinging the bar so as to move the rake into an operative position, these connections comprising in the construction shown, an arm 172 projecting from the rake bar and connected by a link 173 with a hand lever 174. During the operation of the machine the rake is normally moved to retracted position as shown in dotted lines in Figure 23, and the hopper door is closed. The cane then accumulates in the hopper until the latter is sufficiently filled. The operator then moves the hand lever to bring the rake into operation and after the machine has traversed a few feet the rake is moved out of operative position and the hopper door tripped so as to discharge the accumulated cane upon the space cleaned by the rake. The hopper door is then closed and the cane again accumulates therein as the machine proceeds. The cane is thus discharged in piles upon the clean spots on the ground, the cane having been previously topped, stripped, cut in two in the middle, and separated from the loose trash by the blower, all as above set forth.

Any suitable driving connections may be utilized for transmitting power from the motor to the various parts to be driven. In Figure 1 the driving connections which I prefer to employ are illustrated diagrammatically. To refer to these briefly, the motor shaft drives a transmission 180 from which a shaft 181 extends to the differential 182. The tractor belts are driven by chains 183 and 184 from this differential. The other parts of the mechanism are driven from the shaft 190 which is driven from the transmission by chain 191. A shaft 195 is driven from the shaft 190 by a chain 196. Through the medium of a chain 197, beveled gearing, and a shaft 198, beveled gearing in a housing 199 is driven, which in turn drives the cutters 6 through the chains 7. The pick-up chain driving shafts 24 are driven from the shaft 195 through the chain 200 and beveled gearing. The elevator chain is driven from the shaft 190 by a chain 205 and the mud chain is driven from the elevator chain by the spur gears 59 and 60. The conveyor chains are driven from the shaft 190 through the chains 206 and 207 and beveled gearing. The apron 136 is driven from the elevator sprocket shaft through a chain 208.

While I have illustrated and described in detail a machine embodying my improvements in cane harvesters in preferred form, it is to be understood that the improvements are capable of many different embodiments, and I do not wish to be limited to the precise constructions described. On the other hand, I intend to cover my invention broadly in whatever form its principles may be utilized. Many of the features of my invention may, furthermore, be utilized without others, or in different relations than as particularly set forth. Some of the features may be entirely dispensed with if desired. For instance, the middle cutter, blower, hopper and rake may all be omitted. Other parts of the apparatus may also in some instances be omitted or utilized in modified form.

The stripping and topping mechanisms are not claimed in detail herein for the reason that they form the subject matter of divisional applications Serial No. 396,004, filed July 13, 1920, now Patent No. 1,541,231, granted June 9, 1925, and Serial No. 566,730, filed June 8, 1922, now Patent No. 1,583,478, granted May 4, 1926, respectively.

Having thus described my invention, I claim:—

1. In a machine of the kind described, a forwardly extending pick-up chain, and means for driving the chain in one direction, said chain having passable fingers hinged to swing out of the way when overtaken by work moving in the direction in which the chain is driven to permit the work to pass them, and means for limiting movement of the fingers in the opposite direction to outwardly projecting positions, whereby the fingers constitute feeding means for compelling the work to move as fast as the pick-up chain, but offer no obstruction to movement of the work in the direction in which the chain is driven, at a higher rate than that at which the chain is driven.

2. In a machine of the character described the combination of a pair of cooperating forwardly extending pick-up chains forming a throat for the reception of the cane, said chains having pick-up fingers hinged thereon and free to swing from a position perpendicular to a position parallel to the said chains in the direction of movement of the chains, and means for positively driving the chains.

3. In a machine of the character described the combination of a pick-up chain having fingers adapted to yield in the direction of movement of the chain, conveying means for the cane adapted to receive the cane from the pick-up chain and convey it at a higher speed than that at which the pick-up chain travels and means for driving said chains.

4. In a machine of the character described the combination of rapidly moving cane conveying means, and fingered pick-up means for feeding the cane to the conveying means, the fingers of said pick-up means being yieldable in the direction of travel of the cane while carried by the conveying means.

5. In a machine of the character described the combination of rapidly driven conveyor chains for conveying the cane, slow-moving pick-up chains for feeding the cane to the conveyor chains and means for driving said chains.

6. In a machine of the character described the combination of upwardly and rearwardly inclined conveyor chains for grasping the cane in a substantially upright position and carrying it towards the rear of the machine, and similarly inclined convergent cooperating pick-up chains for engaging the cane near the ground, swinging it to a substantially upright position and feeding it to the conveyor chains.

7. In a machine of the character described the combination of rearwardly and upwardly inclined cooperating conveyor chains for conveying the cane through the machine in a substantially upright position, and cooperating pick-up chains extending forwardly and downwardly of the conveyor chains and having outwardly flaring portions adapted to form a converging mouth or throat for gathering in the cane near the ground, swinging it to an upright position and feeding it to the conveyor chains.

8. In a machine of the character described the combination of rearwardly and upwardly inclined conveyor chains for conveying the cane through the machine in a substantially upright position, pick-up chains extending forwardly of the conveyor chains and having outwardly flaring portions adapted to form a converging mouth or throat for gathering in the cane and feeding it to the conveyor chains, and means for driving the conveyor chains at a higher speed than that at which the pick-up chains are driven.

9. In a machine of the character described the combination of rearwardly and upwardly inclined cooperating conveyor chains for conveying the cane through the machine in a substantially upright position, and pick-up chains extending forwardly of the conveyor chains and having outwardly flaring portions adapted to form a converging mouth or throat for gathering in the cane and feeding it to the conveyor chains, said pick-up chains being provided with fingers yieldable in the direction of movement of the cane while carried by the conveyor chains.

10. In a machine of the character described the combination of conveyor chains for conveying the cane rearwardly through the machine, pick-up chains for feeding the cane to the conveyor chains, means for driving the pick-up chains at substantially the speed of movement of the machine, and means for driving the conveyor chains at a higher speed.

11. In a machine of the character described, the combination of cooperating cane conveying chains, and leaf springs cooperating therewith to press the chains toward one another, said springs being arranged in alternate or staggered relation at opposite sides of the chains to distribute the work gripping pressure along the chains.

12. In a machine of the character described a plurality of conveyor chains adapted to grasp the cane between them, leaf springs for holding the chains in engagement with the cane, and means for limiting the movement of the springs in the direction of the plane of travel of the cane, said means being adjustable to vary said limit of movement of the springs.

13. In a machine of the character described, the combination with cooperating cane conveying chains, of a plurality of presser springs bearing at spaced intervals against one of the chains to press it toward the other, and a presser spring bearing against said other chain to press it toward the first mentioned chain, the last mentioned spring being located between the two first mentioned springs, whereby direct opposition of the springs is avoided.

14. In a machine of the character described the combination of a cane conveying chain and a presser member adapted to cooperate therewith, said member being supported at its end towards the front of the chain and extending beside the chain in the direction of travel thereof and inclined outwardly so as to bear near its free end against the back of the chain, and means for adjustably limiting the movement of the free end of said presser member towards the chain.

15. In a machine of the character described, the combination of cooperating cane conveying chains, and presser springs cooperating therewith to press the chains toward one another, said presser springs being arranged in alternate or staggered relation along the chains to avoid directly opposing one another, and means for limiting the distance that the springs can press the chains so that the course between the chains will not be rendered devious by the pressure of said springs.

16. In a machine of the character described the combination of a cane conveying chain and a presser member adapted to cooperate therewith, said member being supported at its end towards the front of the chain and extending beside the chain in the direction of travel thereof, and inclined outwardly so as to bear near its free end against the back of the chain, and guard means for preventing the chain from catching behind said member when forced off the bearing surface of the member.

17. In a machine of the character described the combination of a cane conveying chain and a presser spring adapted to cooperate therewith, said spring being supported at its end towards the front of the chain and extending beside the chain in the direction of travel thereof, and inclined outwardly so as to bear near its free end against the back of the chain, and guard wings extending from the edges of said spring backwardly away from the chain.

18. In a machine of the character described, cane conveying means including a conveyor chain running over a sprocket, and means for guiding the chain on to the sprocket comprising a fork having arms extending adjacent to opposite faces of the sprocket between which arms the chain is guided.

19. In a machine of the character described, cane conveying means including a conveyor chain running over a sprocket, and means for guiding the chain on to the sprocket comprising a fork having arms extending adjacent to opposite faces of the sprocket and part way around the same, between which arms the chain is guided.

20. In a machine of the character described, the combination of a plurality of chains adapted to grip the cane and carry the same through the machine in a standing position, sprockets about which said chains run, and means providing guiding surfaces adjacent to opposite faces of the sprockets for guiding the chains on to the sprockets.

21. In a machine of the character described, conveyor chains adapted to grip the cane and carry it through the machine, driving sprockets for the chains and guide arms for guiding the chains on to the driving sprockets.

22. In a machine of the character described the combination of cane conveying means adapted to grip and hold the cane and convey it through the machine in a standing position, and a chute substantially parallel to said conveying means for guiding the butts of the cane stalks, said chute including means forming a traveling bottom therefor.

23. In a machine of the character described the combination of cane conveying chains adapted to press upon and grip the cane stalks upon opposite sides, and convey the same through the machine, and an endless belt running substantially parallel to said conveying chains for supporting the butts of the cane stalks.

24. In a machine of the character described the combination of cane conveying means for conveying the cane through the machine in a standing position, and a trip chute for guiding the butts of the cane stalks, said trip chute having means forming a traveling bottom therefor, the forward end of the trip chute being so located with reference to the path of travel of the cane when carried by the conveying means that it will strike the cane stalks above the butts thereof, so as to tilt the cane.

25. In a machine of the character described the combination of cane conveying means and a chute for guiding the butts of the cane stalks, a plurality of endless belts driven in opposite directions forming the bottom of the chute.

26. In a machine of the character described the combination of means for conveying the cane through the machine in a standing position, and a chute for guiding the butts of the cane stalks, a part of the bottom of the chute being formed by an endless belt traveling in a direction opposite to that of the movement of the cane.

27. In a machine of the character described the combination of means for conveying the cane through the machine adapted to grip the cane and hold it in a standing position, and a chute for guiding the butts of the cane stalks, a part of the bottom of the chute being formed by an endless belt traveling in the same direction as the movement of the cane.

28. In a machine of the character described, means for conveying the cane through the machine in a standing position, a traveling belt for supporting the butts of the cane, and means for driving said belt in the direction of movement of the cane at a slightly higher speed than the speed of movement of the cane conveying means.

29. In a machine of the character described, having means for conveying the cane through the machine in a standing position, a traveling belt for supporting the butts of the cane, and means for driving said belt in the direction of movement of the cane, said belt being provided at intervals with raised flights having sharpened edges to prevent fallen cane from slipping thereover.

30. In a machine of the character described, having means for conveying the cane through the machine in a standing position, a traveling belt for supporting the butts of the cane, and means for driving said belt in the direction of movement of the cane, said belt being provided at intervals with raised flights, some of which are higher than others and are provided with serrated edges.

31. In a machine of the character described the combination of rearwardly and upwardly inclined conveyor chains adapted to convey the cane through the machine in a standing position, and a rearwardly and upwardly inclined trip chute below the conveyor chains adapted to guide the butts of the cane, the bottom of the forward lower part of said trip chute being formed by a belt traveling in a direction opposite to that of the movement of the cane, the lower forward portion of said belt being so located as to engage the cane stalks slightly above the butts thereof and trip the stalks into a rearwardly inclined position.

32. In a machine of the character described, having means for conveying the cane through the machine in a standing position, an elevator belt for supporting the butts of the cane, said belt having raised flights thereon undercut at their bases, and guide rails for supporting the runs of said belt.

33. In a machine of the character described, means for topping and stripping the cane, a rake carried by the machine adapted to be intermittently operated to rake the trash from portions of the ground, a hopper carried by the machine adapted to receive the stripped and topped cane and means for intermittently discharging the cane from the hopper upon the cleared spaces.

34. In a machine of the character described, the combination of topping and stripping devices, means for separating the loose trash from the topped and stripped cane, a hopper adapted to receive the topped, stripped and cleaned cane and discharge the same at intervals upon the ground, and means for clearing spaces on the ground in advance of the hopper to receive the cane discharged therefrom.

35. A harvester for sugar cane having conveying means operating to convey the cane rearwardly at a higher speed than the speed of forward travel of the machine, and means for delivering the cane to the conveying means having cane engaging members movable out of the path of the cane as it is engaged by the conveying means.

36. A harvester for sugar cane having conveying means including an endless traveling member yieldingly engaging the cane at one side thereof, and a plurality of endless traveling members yieldingly engaging the cane at the other side thereof at points above and below the point of engagement of the first mentioned endless member.

37. A harvester for sugar cane having conveying means including an endless traveling member engaging the cane at one side thereof, and a plurality of independent endless traveling members engaging the cane at the other side thereof at points above and below the point of engagement of the first mentioned endless member.

38. A harvester for sugar cane having conveying means including an endless traveling member engaging the cane at one side thereof, and a plurality of independent endless traveling members yieldingly engaging the cane at the other side thereof at points above and below the point of engagement of the first mentioned endless member.

39. A harvester for sugar cane having conveying means including an endless traveling member yieldingly engaging the cane at one side thereof and a plurality of endless traveling members yieldingly engaging the cane at the other side thereof at points above and below the point of engagement of the first mentioned endless member, one of the endless members being provided with cane engaging abutments projecting inwardly therefrom for advancing the cane, and the other endless members being smooth faced.

40. In a machine of the character described, the combination of inclined, convergent, cooperating pick-up chains for engaging the cane near the ground and swinging it to a substantially upright position, and upwardly and rearwardly inclined conveyor chains arranged to grasp the cane fed by the pick-up chains in a substantially upright position, comprising a traveling chain for yieldingly engaging the cane at one side thereof, and a plurality of traveling chains yieldingly engaging the cane at the other side thereof at points above and below the point of engagement of the first mentioned chain to carry the cane without substantially lateral tilting upwardly and rearwardly through the machine.

41. In a machine of the character described, the combination of inclined, convergent, cooperating pick-up chains for engaging the cane near the ground and swinging it to a substantially upright position, upwardly and rearwardly inclined conveyor chains arranged to grasp the cane fed by the pick-up chains in a substantially upright position, and means to intercept the lower ends of the cane stalks in the grasp of the conveyor chains to tilt the cane to an inclined position.

GEORGE D. LUCE.